July 1, 1941.  A. S. LONG  2,247,445
FILTER
Filed May 27, 1938

INVENTOR.
ANGUS S. LONG
BY Flournoy Corey.
ATTORNEY.

Patented July 1, 1941

2,247,445

UNITED STATES PATENT OFFICE 2,247,445

FILTER

Angus S. Long, Cedar Rapids, Iowa, assignor to H. Perry Smith, Albany, N. Y.

Application May 27, 1938, Serial No. 210,413

7 Claims. (Cl. 210—131)

This invention relates to filters and has particular relation to filtering elements for filtering systems of internal combustion engines.

Filters have been employed in connection with internal combustion engines, motor vehicles, and the like, in which the oil is passed through cartridges of cotton waste and similar materials to filter out the carbon and other impurities in the oil. In devices of this character it has been customary to utilize cartridges which are packed with cotton waste and like material formed in cylindrical form and surrounded by a loosely woven envelope of wire netting, cotton cloth or the like. It was necessary to do this in order that the filtering material might be packed under the proper compression. If the cotton waste is packed too loosely, the oil works a channel through the filter and the filtering effect is lost. If the filtering material is too tightly packed, the oil cannot force its way through the material. If the waste is not compressed sufficiently, it may wad up in the top of the filtering chamber to materially restrict the flow of oil.

These cartridges are relatively expensive, and inasmuch as they have to be replaced at intervals, the upkeep of filters of this character is high. It has hitherto been impossible to use loose cotton waste and the like, not in cartridge form, because as a practical consideration, the mechanic filling the filter shell with loose waste could not pack it to the proper degree. The waste might be wadded too tightly in one portion of the filter and too loosely in another.

It is, therefore, a general object of my invention to avoid the difficulties above enumerated and to provide a new and improved filtering device and system.

It is more particularly among the objects of my invention to provide means for holding, compressing and distributing bulk filtering material in a filtering chamber so that the filtering material will act properly as a filtering agent.

Another object of my invention is to provide means for packing and holding filtering material in a filter chamber.

Other and further features and objects of my invention will be more apparent to those skilled in the art upon a consideration of the accompanying drawing and following specification, wherein are disclosed two exemplary embodiments of the invention, with the understanding, however, that such changes may be made therein as fall within the scope of the appended claims, without departing from the spirit of the invention.

Figure 1:
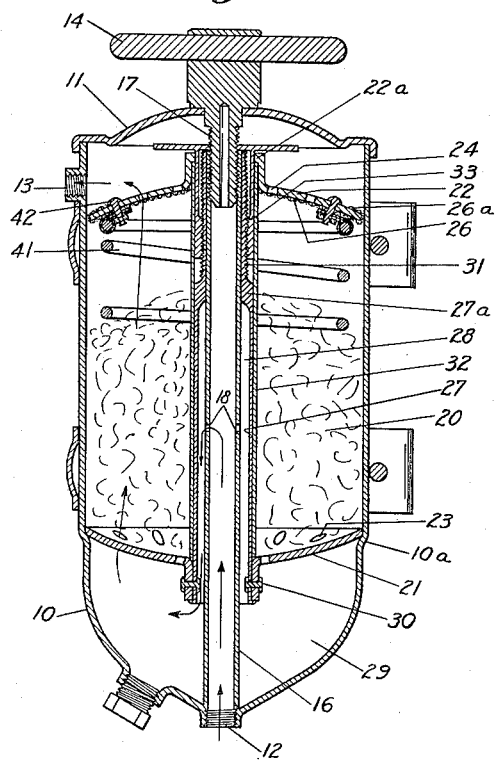
Figure 1 is a view in section of a complete filter constructed according to a preferred embodiment of my invention.
Figure 1:
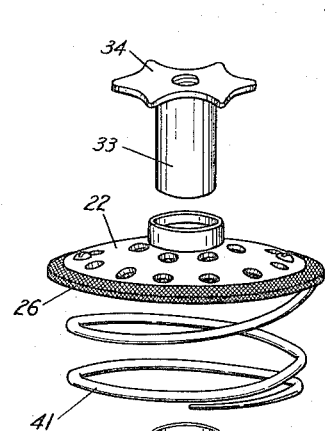
Figure 3:
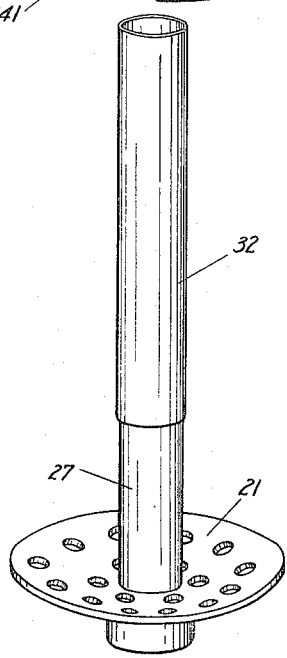
Figure 3 is a view in exploded relation of the parts shown in Figures 1 and 2.
Figure 2:
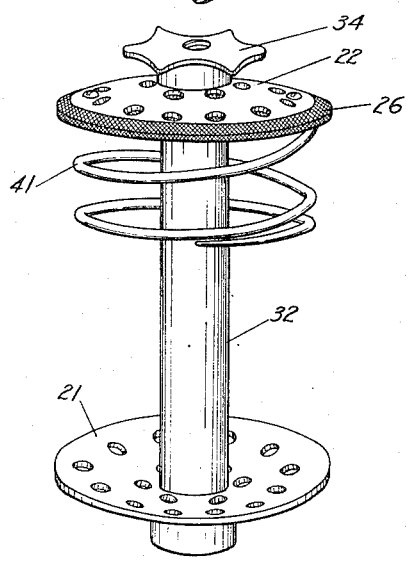
Figure 2 is a view in perspective of the parts of the device shown in Figure 1 with the exception of a container and filtering element.

Referring now to the drawing:

The usual filtering devices known to the art employ a cylindrical shell-like casing, such as illustrated at 10, covered by the cover 11 and having the inlet opening 12 and outlet opening 13. The cap or cover 11 may be held in place by means of a hand wheel such as 14 which, in the present case, engages the intake tube 16. The threaded stem 17, to which the hand wheel 14 is attached, engages threads on the inside of the intake conduit 16 in the present instance. Of course, other means may be employed for securing the cover 11 on the container 10.

In the devices ordinarily used with the container structure here shown, a pre-packed filter having a vertical bore therethrough would be placed on the intake conduit 16 and the cover locked in place. Oil would then enter through the intake 12, pass through the openings 18 and through the filtering cartridge (not shown) and out through the outlet 13.

In order to permit the use of loose waste and the like as a filtering material I have provided means for confining and compressing a given quantity of waste to a predetermined pressure, such that the waste is neither too loosely packed so as to permit the oil to run freely therethrough, nor too closely packed to prevent the passage of oil altogether. A preferred device consists of upper and lower compression members such as cupped discs for holding the waste and means for drawing these members together to compress the waste to the proper degree. In addition, I may provide means for guiding the waste, in packing, and distributing it, because it is obvious that the introduction of the waste into the container is not easy in view of the central post structure and the necessity for applying pressure to the waste.

The structure here shown includes a pair of confining members such as the cupped discs 21 and 22. These discs are almost identical but they are located in reversed position within the container 10. Both discs are perforated, as indicated at 23 and 24, to permit oil to pass therethrough. The upper disc 22 is provided with a fine mesh copper screen 26 on its lower face, and this screen extends over the edge of the disc 22 and is secured to the upper face, as indicated at 26a, so that a close fit is provided between the disc 22 and the wall of the can 10, and in order that bits of lint and the like will not pass through the filter and out through the outlet 13 into the motor. The lower confining member or disc 21 is mounted on an inner sleeve 27 and is secured thereto by any desired means, as for instance the rivets 30. This inner sleeve 27 is spaced from the conduit 16, as indicated at 28, and thus oil passing out through the holes 18 flows down in the direction of the arrows and into the lower chamber 29 below the disc 21. The inner sleeve 27 engages the outer wall of the intake conduit 16 at the upper end of the sleeve, as indicated at 27a, and is provided with threads 31 on the upper outer face thereof. The upper disc 22 is provided with a small flange 22a and is mounted on an outer sleeve 32 which may slide up and down in telescopic relation on the inner sleeve 27. A locking sleeve 33 is provided having threads on the inner wall thereof to engage the threads 31 of the sleeve 27. This locking sleeve 33 is provided with a thumb wheel 34 for rotating the sleeve.

In loading the filter unit with waste 20 the cap 11 is, of course, removed and the inner sleeve 27 and disc 21 placed on the conduit 16 so that the disc 21 is near the top of the container 10. The waste 20 is loaded into the container and the disc 21 gradually pushed down until, when all the waste has been loaded, the disc 21 rests on the flange 10a of the container 10. The outer sleeve 32 is then telescoped over the inner sleeve 27 to bring the upper disc 22 into the container. The thumb wheel 34 is rotated to screw the locking sleeve down on the threads 31 of the inner sleeve 27 to apply downward pressure to the disc 22 to compress the waste 20. The thumb wheel 34 is rotated until the outer sleeve 32 bottoms against the lower disc 21, as illustrated in Figure 1. The cover 11 may then be placed on the container 10 and locked in place by means of the hand wheel 14.

It will be noted that I have provided a spring member 41 which is secured to the underside of the upper disc 22 by means of bolts 42. This spring 41 is of considerable assistance in securing a good filtering action, as it is useful in applying resilient pressure to the upper face of the mass of filtering material. Furthermore, under pressure of oil in the chamber 29 and in the waste 20, the spring may be compressed slightly to permit limited movement of the waste up and down to insure the oil filtering through the waste.

In use the waste crowds up toward the top by reason of oil pressure at the bottom and would stay in this condition without the spring. The spring forces the waste back down again when the oil pressure is discontinued and thus jamming and packing of the waste is prevented by the spring. The spring also pushes the waste ahead of the upper disc to prevent jamming of the waste around the disc during packing of the waste.

In using devices constructed according to my invention a certain predetermined quantity of waste is provided for each filling. This waste may be packed loosely in sacks with each sack containing only enough waste for one filling of the filter. When a new filtering material is needed the cap 11 is removed and the old charge of waste may be readily withdrawn by pulling out the unit, consisting of upper and lower discs and inner and outer sleeves, by means of the thumb wheel 34. The sleeve 33 is then unscrewed to permit entire disassembly of the parts of the unit and removal of the old waste.

In repacking the filter the inner sleeve is placed on the upper end of the central stem 16 and waste distributed evenly around the extended outer sleeve. As the waste is distributed around the sleeves the lower disc is inserted deeper into the container 10. When the entire charge of waste has been introduced into the container the upper disc 21 is biased downwardly toward the lower disc by means of the locking sleeve 33 and thumb wheel 34 to secure the proper compression of the waste. The cap 11 is then placed on the container 10 and the hand wheel 14 rotated until the cap is tightly locked on the container 10 by means of the engagement of the stem 17 with the inlet conduit 16.

It is apparent that devices constructed according to my invention may be modified for use with substantially all of the existing types of filters. For instance, some of the devices may not employ the hollow inlet conduit 16. In this case the sleeves may be of smaller diameter and, in fact, the inner sleeve may be a solid rod.

It is apparent, therefore, that modifications of my invention may be made by those skilled in the art. Such modifications may be made without departing from the spirit and scope of my invention as set forth in the appended claims.

I claim as my invention:

1. A device adapted for use in forming in place within a hollow casing a unitary filter cartridge of fibrous material comprising a pair of perforated confining members adapted to fit closely the interior side walls of said casing but freely insertable and withdrawable therefrom and forming end walls for said cartridge, a centrally-disposed, post-like structure comprising inner and outer, telescopically cooperating elements, one slidable within the other, extending between said confining members and serving to guide them for relative movement towards each other; the inner one of said elements being threaded at one end and secured at its other end to one of said members; and threaded means extending into said outer element and coacting with the threaded end of said inner element and the other of said members for forcing said members towards each other to compress fibrous material placed therebetween and about said post-like structure into close engagement with the side walls of said casing and also to secure said confining members together in substantially fixed relation with the fibrous material so compressed; whereby the whole may be withdrawn as a unit from said casing.

2. A device adapted for use in forming in place within a hollow casing a unitary filter cartridge of fibrous material comprising a pair of perforated confining members adapted to fit closely the interior side walls of said casing but freely insertable and withdrawable therefrom and forming end walls for said cartridge, a centrally-disposed, post-like structure comprising inner and outer, telescopically cooperating elements, one slidable within the other, extending between said confining members and serving to guide them for relative movements towards each other; one of said members being seated on the end of said outer element and the other of said members being secured to said inner element; and means coacting with the last mentioned element and said seated member for forcing said members towards each other to compress fibrous material placed therebetween and about said post-like structure into close engagement with the side walls of said casing and also to secure said confining members together in substantially fixed relation with the fibrous material so compressed; whereby the whole may be withdrawn as a unit from said casing.

3. The structure set forth in claim 2 including a spring positioned adjacent one of said members and about said post-like structure, and adapted to form a resilient cushion between said member and said fibrous material.

4. A filter comprising a hollow casing having a fluid outlet therein and provided with a centrally-disposed, axially-extending tube through which fluid is introduced into said casing, a lower, perforated, filtering-material-confining member having an elongated sleeve secured thereto surrounding said tube, means supporting said member and sleeve assembly in said casing, whereby it is readily insertable in and withdrawable therefrom, an upper, perforated, filtering-material-confining member, and means coacting with said upper member and said sleeve for forcing said members towards each other to compress filtering material placed therebetween and to force it into close engagement with said sleeve and the interior side walls of said casing, and also for securing said members and sleeve together in fixed relation with the material so compressed; whereby said members with said filtering material compressed between them may be withdrawn from said casing as a unit.

5. The structure set forth in claim 4 in which said sleeve comprises two tubular elements, one telescopically slidable over the other and having the upper confining member seated on the end thereof.

6. The structure set forth in claim 4 including a spring positioned and compressed between the upper confining member and the top of the filtering material.

7. The structure set forth in claim 4 including a spring positioned and compressed between the upper confining member and the top of the filtering material and in which said sleeve comprises two tubular elements, one telescopically slidable over the other and having said upper confining member seated on the end thereof.

ANGUS S. LONG.